United States Patent
Lu et al.

(10) Patent No.: US 10,325,150 B2
(45) Date of Patent: Jun. 18, 2019

(54) SYSTEM AND METHOD FOR ELECTRIC LOAD IDENTIFICATION AND CLASSIFICATION EMPLOYING SUPPORT VECTOR MACHINE

(75) Inventors: Bin Lu, Shanghai (CN); Ronald G. Harley, Lawrenceville, GA (US); Liang Du, Atlanta, GA (US); Yi Yang, Milwaukee, WI (US); Santosh K. Sharma, Maharashtra (IN); Prachi S. Zambare, Maharashtra (IN); Mayura A. Madane, Maharashtra (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 1994 days.

(21) Appl. No.: 13/597,324

(22) Filed: Aug. 29, 2012

(65) Prior Publication Data

US 2014/0067299 A1 Mar. 6, 2014

(51) Int. Cl.
*G06F 11/30* (2006.01)
*G06K 9/00* (2006.01)

(52) U.S. Cl.
CPC ....... *G06K 9/00536* (2013.01); *G06K 9/0053* (2013.01); *Y04S 20/38* (2013.01)

(58) Field of Classification Search
CPC .......................... G06K 9/0053; G06K 9/00536
See application file for complete search history.

(56) References Cited

U.S. PATENT DOCUMENTS

| | | | |
|---|---|---|---|
| 4,858,141 A | 8/1989 | Hart et al. | |
| 5,483,153 A * | 1/1996 | Leeb et al. | 324/76.12 |
| 5,717,325 A | 2/1998 | Leeb et al. | |
| 5,910,875 A | 6/1999 | Tian et al. | |
| 6,081,123 A * | 6/2000 | Kasbarian et al. | 324/521 |
| 7,268,989 B2 | 9/2007 | Parker et al. | |
| 7,362,552 B2 | 4/2008 | Elms et al. | |
| 2006/0018060 A1 | 1/2006 | Elms et al. | |
| 2006/0227469 A1 | 10/2006 | Parker et al. | |
| 2007/0086124 A1 | 4/2007 | Elms et al. | |
| 2009/0072985 A1 * | 3/2009 | Patel et al. | 340/657 |

FOREIGN PATENT DOCUMENTS

| | | |
|---|---|---|
| GB | 2465367 A | 5/2010 |
| WO | 2010/005985 A1 | 1/2010 |

OTHER PUBLICATIONS

U.S. Department of Energy, "Annual Energy Review 2010", Oct. 2011, pp. 266-267, Energy Information Administration, Washington, D.C., DOC/EIA-0384(2010).

(Continued)

*Primary Examiner* — Phuong Huynh
(74) *Attorney, Agent, or Firm* — Eckert Seamans

(57) ABSTRACT

A method identifies electric load types of a plurality of different electric loads. The method includes providing a support vector machine load feature database of a plurality of different electric load types; sensing a voltage signal and a current signal for each of the different electric loads; determining a load feature vector including at least six steady-state features with a processor from the sensed voltage signal and the sensed current signal; and identifying one of the different electric load types by relating the load feature vector including the at least six steady-state features to the support vector machine load feature database.

18 Claims, 10 Drawing Sheets

(56) References Cited

OTHER PUBLICATIONS

U.S. Department of Energy, "Annual Energy Outlook 2010: With Projections to 2035", Apr. 2010, pp. 57-62, Energy Information Administration, Washington, D.C., DOC/EIA-0383(2010).

Hendron, R., et al., "Development of an Energy-Savings Calculation Methodology for Residential Miscellaneous Electric Loads", Conference Paper, Aug. 2006, 15 pp., ACEEE Summer Study on Energy Efficiency in Buildings, Pacific Grove, CA, NREL/CP-550-39551.

Du, Y., et al., "A Review of Identification and Monitoring Methods for Electric Loads in Commercial and Residential Buildings", 2010, pp. 4527-4533, Proc. 2010 IEEE Energy Conversion Conf. and Expo., Atlanta, GA.

Hart, G., "Nonintrusive Appliance Load Monitoring", Proceedings of the IEEE, 1992, pp. 1870-1891, vol. 80.

Norford, L.K., et al., "Non-intrusive electrical load monitoring in commercial buildings based on steady-state and transient load-detection algorithms", 1996, pp. 51-64, Energy and Buildings, vol. 24.

Drenker, S., et al., "Nonintrusive Monitoring of Electric Loads", Computer Applications in Power, IEEE, Oct. 1999, pp. 47-51, vol. 12.

Sultanem, F., "Using Appliance Signatures for Monitoring Residential Loads at Meter Panel Level", IEEE Transactions on Power Delivery, Oct. 1991, pp. 1380-1385, vol. 6, No. 4.

Laughman, C., et al., "Power Signature Analysis", IEEE Power and Energy Magazine, 2003, pp. 56-63, vol. 2.

Jian, L., et al., "Load Signature Study—Part I: Basic Concept, Structure, and Methodology", IEEE Transactions on Power Delivery, Apr. 2010, pp. 551-560, vol. 25, No. 2.

Cole, A., et al., "Nonintrusive Identification of Electrical Loads in a Three-Phase Environment Based on Harmonic Content", Proc. 17th IEEE Instrumentation and Measurement Technology Conf., 2000, pp. 24-29.

Srinivasan, D., et al., "Neural-Network-Based Signature Recognition for Harmonic Source Identification", IEEE Transactions on Power Delivery, Jan. 2006, pp. 398-405, vol. 21, No. 1.

Srivastava, S., et al., "PSO & Neural-Network Based Signature Recognition for Harmonic Source Identification", TENCON 2009—2009 IEEE Region 10 Conference, 2009, pp. 1-5.

Patel, S., et al., "At the Flick of a Switch: Detecting and Classifying Unique Electrical Events on the Residential Power Line", Proceedings of the 9th international conference on Ubiquitous Computing, 2007, pp. 271-288, Innsbruck, Austria.

Du, L., et al., "Self-Organizing Classification and Identification of Miscellaneous Electrical Loads", IEEE Power and Energy Society General Meeting, 2012, 6 pp., San Diego, CA.

Widipedia, "Support vector machine", http://en.wikipedia.org/wiki/Support_vector_machine, 2011, 11 pp.

Theodoridis, S., et al., "Pattern Recognition", pp. 93-101 and 121-28, 4th edition, Nov. 3, 2008, Academic Press.

* cited by examiner

SYSTEM AND METHOD FOR ELECTRIC LOAD IDENTIFICATION AND CLASSIFICATION EMPLOYING SUPPORT VECTOR MACHINE

This invention was made with Government support under DE-EE0003911 awarded by the Department of Energy National Energy Technology Laboratory. The Government has certain rights in this invention.

CROSS-REFERENCE TO RELATED APPLICATIONS

This application is related to commonly assigned, copending U.S. patent application Ser. No. 13/304,783, filed Nov. 28, 2011, entitled "System And Method Employing A Hierarchical Load Feature Database To Identify Electric Load Types Of Different Electric Loads";

U.S. patent application Ser. No. 13/304,758, filed Nov. 28, 2011, entitled "System And Method Employing A Self-Organizing Map Load Feature Database To Identify Electric Load Types Of Different Electric Loads"; and U.S. patent application Ser. No. 13/304,834, filed Nov. 28, 2011, entitled "System And Method Employing A Minimum Distance And A Load Feature Database To Identify Electric Load Types Of Different Electric Loads".

BACKGROUND

Field

The disclosed concept pertains generally to electric loads and, more particularly, to methods of identifying electric load types of electric loads. The disclosed concept also pertains to systems for identifying electric load types of electric loads.

Background Information

Electric loads in residential and commercial building sectors account for over 75% of the total electricity consumption in the United States in 2009. Electric loads are commonly divided into several groups, such as for example and without limitation, space conditioning loads, water heating loads, ventilation loads, major appliances, lighting loads, and miscellaneous electric loads (MELs). MELs are the wide and diverse collection of portable and plug-in electricity-consuming devices along with all hard-wired electric loads that do not fit into other categories. TV sets and accessories, computers and accessories, portable equipment using chargers, and kitchen appliances are examples of typical MELs. Compared with any other single major category, MELs currently consume the largest portion of electricity. A recent report from the U.S. Department of Energy (DoE) predicts that MELs consumption will increase by an average of 2.3 percent per year and, in 2035, will account for 40 percent of the total electricity consumption in the commercial sector.

MELs' relatively large portion in electricity consumption leads to increasing needs and opportunities of energy management and saving. A recent U.S. DoE research program, called Building America, aims at 50% energy savings in new homes by 2015 and 100% savings (zero net energy) by 2020. This program has started to identify and develop advanced solutions that can significantly reduce MELs' power consumption. Moreover, granular load energy consumption and performance information is desired to accelerate the path toward smarter building energy intensity reduction, demand response, peak shaving, and energy optimization and saving.

MELs present special challenges because their operations are mainly under the need and control of building occupants. Without advanced control and management, MELs can constitute 30% to 40% of the electricity use in homes. Furthermore, MELs are distinct from other load categories as many MELs are of notable importance in daily life. For instance, a circuit protection device on an uninterruptable power supply (UPS) or at the input to a power strip interrupts all downstream power circuits when an overcurrent fault happens, but such an unexpected power interruption will cause sensitive equipment, such as a plugged-in desktop computer, to lose all current memory-based work.

MELs currently consume more electricity than any other single end-use service. MELs provide granular energy consumption and performance information to meet rising needs and opportunities of energy saving, demand response, peak shaving, and building management. A reliable intelligent method and system to identify different MELs is desired.

Several methods have been proposed to non-intrusively identify electric loads. Such known methods mainly consist of two major categories. Steady-state features, such as instantaneous real power, power factor, V-I trajectory and harmonic components, are extracted from voltage and current measurements. In the first category, some methods compare these features and their variations with a predefined database. In the second category, some methods adopt computational intelligent (CI) algorithms, such as radial basis functions (RBF), particle swarm optimization (PSO) and artificial neural networks (ANN).

The former category has disadvantages in accuracy, robustness and applicability. For instance, different MELs with similar front-end power supply units are not distinguishable in this manner. Also, few of the known methods are specifically designed for MELs. As a result, products on market, such as Navetas™ and enPowerMe™, are restricted to only a limited number of MELs.

The latter category suffers from the lack of knowledge during training and computational cost, which limits its applicability.

Moreover, the rapid development of power supply designs brings challenges to load identification. One type of MEL may be supplied by different power supply topologies. Therefore, a reliable load identification algorithm should be able to identify loads with diverse specifications, such as manufacturer and power rating.

A support vector machine (SVM) is a well known concept in computer science for a set of related supervised learning methods that analyze data and recognize patterns, used for classification and regression analysis. A SVM has discriminative power for static classification problems and the capability to construct flexible decision boundaries. The standard SVM takes a set of input data made up of training examples and predicts, for each given input example, which of two possible classes the input belongs. This makes the SVM a non-probabilistic binary linear classifier. Given a set of training examples, each marked as belonging to one of two categories, an SVM training algorithm builds a model that assigns the examples into one category or the other. An SVM model is a representation of the examples as points in space, mapped so that the examples of the separate categories are divided by a clear gap that is as wide as possible. New examples are then mapped into that same space and predicted to belong to one of the categories based on which side of the gap they fall on.

A SVM constructs a hyperplane or set of hyperplanes in a high- or infinite-dimensional space, which can be used for classification, regression, or other tasks. Intuitively, a good separation is achieved by the hyperplane that has the largest distance to the nearest training data points of any class (so-called functional margin), since in general the larger the margin the lower the generalization error of the classifier.

Whereas an original problem may be stated in a finite dimensional space, called the original space, it often happens that the sets to be mapped are not linearly separable in that space. For this reason, the original finite-dimensional space is mapped into a much higher-dimensional space, making the separation easier in that space. To keep the computational load reasonable, the mapping used by SVM schemes are designed to ensure that dot products may be computed easily in terms of the variables in the original space, by defining them in terms of a kernel function $K(x,y)$ selected to suit the problem. The hyperplanes in the higher dimensional space are defined as the set of points whose inner product with a vector in that space is constant. The vectors defining the hyperplanes can be chosen to be linear combinations with parameters $\alpha_i$ of images of feature vectors that occur in the database. With this choice of a hyperplane, the points x in the feature space that are mapped into the hyperplane are defined by the relation:

$$\sum_i \alpha_i K(x_i, x) = \text{constant}$$

If $K(x,y)$ becomes small as y grows further from x, then each element in the sum measures the degree of closeness of the test point x to the corresponding database point $x_i$. In this way, the sum of kernels above can be used to measure the relative nearness of each test point to the data points originating in one or the other of the sets to be discriminated. The set of points x mapped into any hyperplane can be quite convoluted as a result allowing much more complex discrimination between sets which are not convex at all in the original space.

In the case of support vector machines (SVMs), a data point is viewed as a p-dimensional vector (a list of p numbers), and the goal is to separate such points with a (p−1)-dimensional hyperplane. This is called a linear classifier. There are many hyperplanes that might classify the data. One reasonable choice as the best hyperplane is the one that represents the largest separation, or margin, between the two classes. The hyperplane is chosen so that the distance from it to the nearest data point on each side is maximized. If such a hyperplane exists, then it is known as the maximum-margin hyperplane and the linear classifier it defines is known as a maximum margin classifier; or equivalently, the perception of optimal stability.

There is room for improvement in methods of identifying electric load types of a plurality of different electric loads.

There is also room for improvement in systems for identifying electric load types of a plurality of different electric loads.

SUMMARY

These needs and others are met by embodiments of the disclosed concept, which employ support vector machine (SVM) based identification for miscellaneous electric loads and apply either only SVM, or a combination of SVM and a supervised self-organizing map (SSOM).

In accordance with one aspect of the disclosed concept, a method of identifying electric load types of a plurality of different electric loads comprises: providing a support vector machine load feature database of a plurality of different electric load types; sensing a voltage signal and a current signal for each of the different electric loads; determining a load feature vector including at least six steady-state features with a processor from the sensed voltage signal and the sensed current signal; and identifying one of the different electric load types by relating the load feature vector including the at least six steady-state features to the support vector machine load feature database.

The method may comprise training the support vector machine load feature database as a multi-class one-against-all support vector machine for each of a plurality of different load classes or for each of the different electric load types.

The method may employ the at least six steady-state features selected from the group consisting of RMS current value, displacement power factor, total harmonic distortion of current, power factor, current crest factor, current K-factor, admittance, and normalized current third and fifth harmonics.

As another aspect of the disclosed concept, a method of identifying electric load types of a plurality of different electric loads comprises: providing a database including a first layer formed by a supervised self-organizing map database and a second layer formed by a support vector machine database; clustering a plurality of different load classes having a plurality of different load features in the first layer; providing a plurality of different electric load types under each of the different load classes in the second layer; placing different ones of the different electric load types having similar load feature vectors into a same one of the different load classes; sensing a voltage signal and a current signal for each of the different electric loads; determining a load feature vector including a plurality of steady-state features with a processor from the sensed voltage signal and the sensed current signal; and identifying by a support vector machine one of the different electric load types by relating the determined load feature vector including the steady-state features in the second layer of the database.

The method may further comprise: training the supervised self-organizing map database employing data corresponding to the different electric load types; training the support vector machine database as a multi-class one-against-all support vector machine for each of the plurality of different load classes; identifying the one of the different electric load types as being in one of the plurality of different load classes with the supervised self-organizing map database; and identifying the one of the different electric load types with the trained support vector machine database for the one of the plurality of different load classes.

The method may extract information from the trained support vector machine database and store simplified information in a trained neuron grid; employ as the different load classes a plurality of different load categories; determine one of the different load categories employing the determined load feature vector; and employ a support vector machine discriminator function for each the different load categories to identify the one of the different electric load types.

As another aspect of the disclosed concept, a system for identifying electric load types of a plurality of different electric loads comprises: a database including a first layer formed by a supervised self-organizing map database and a second layer formed by a support vector machine database, a plurality of different load classes having a plurality of different load features being clustered in the first layer, a plurality of different electric load types being under each of the different load classes in the second layer, different ones of the different electric load types having similar load feature vectors being placed into a same one of the different load classes; a plurality of sensors structured to sense a voltage signal and a current signal for each of the different electric loads; and a processor structured to determine a load feature vector including a plurality of steady-state features from the sensed voltage signal and the sensed current signal, and identify by a support vector machine one of the different electric load types by relating the determined load feature vector including the steady-state features in the second layer of the database.

The processor may be further structured to train the supervised self-organizing map database employing data corresponding to the different electric load types, train the support vector machine database as a multi-class one-against-all support vector machine for each of the plurality of different load classes, identify the one of the different electric load types as being in one of the plurality of different load classes with the supervised self-organizing map database, and identify the one of the different electric load types with the trained support vector machine database for the one of the plurality of different load classes.

The processor may be further structured to extract information from the trained support vector machine database and store simplified information in a trained neuron grid, employ as the different load classes a plurality of different load categories; determine one of the different load categories employing the determined load feature vector, and employ a support vector machine discriminator function for each the different load categories to identify the one of the different electric load types.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
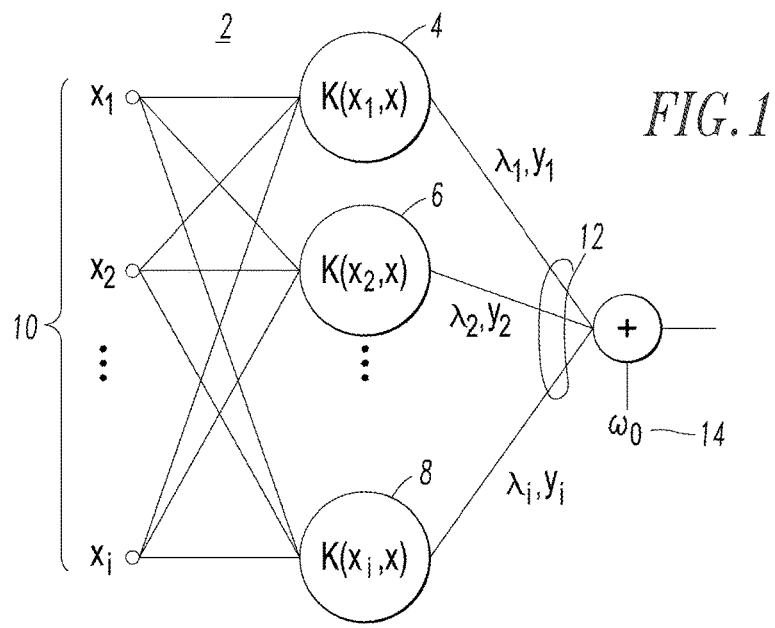
FIG. 1 is a diagram of a support vector machine (SVM) framework employing kernel functions.
Figure 2A:
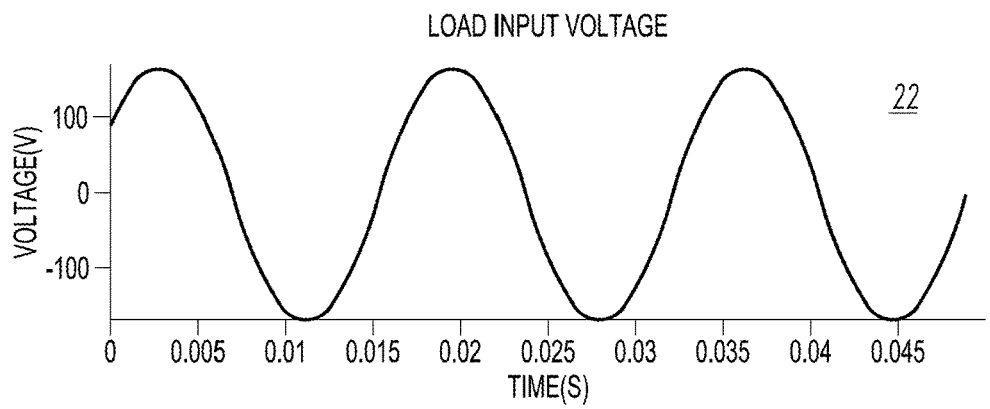
FIGS. 2A and 2B are plots of voltage and current profiles, respectively, of a DVD player.
Figure 2B:
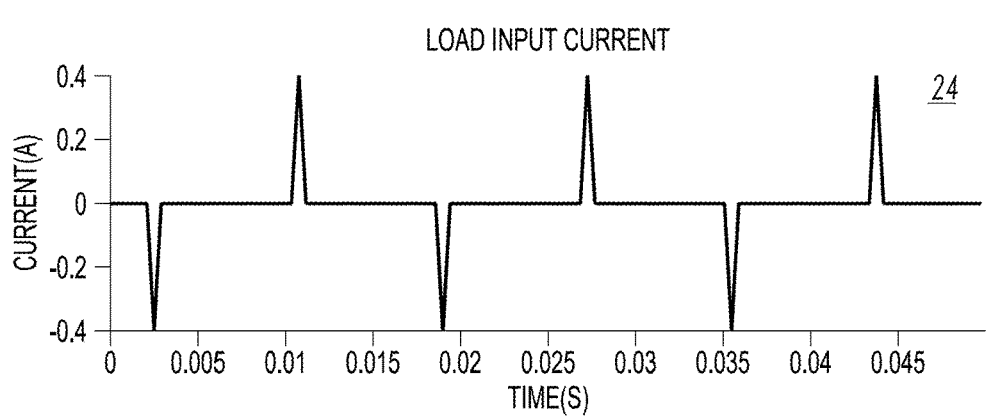
Figure 2C:
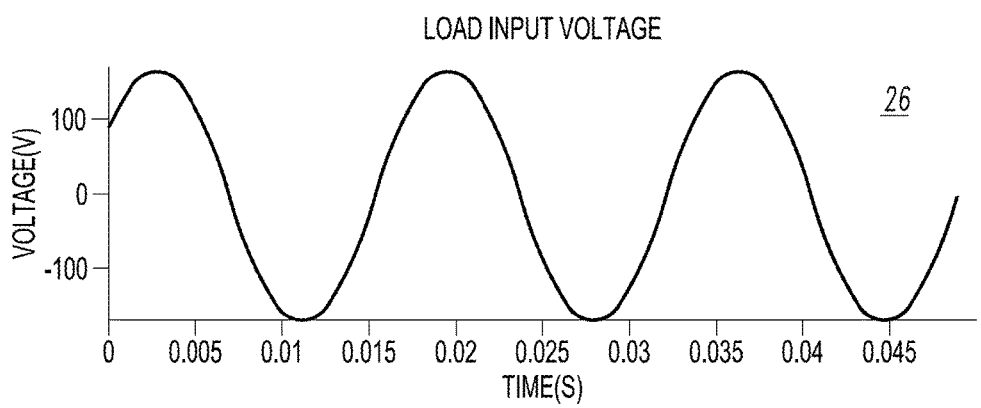
FIGS. 2C and 2D are plots of voltage and current profiles, respectively, of an LCD TV.
Figure 2D:
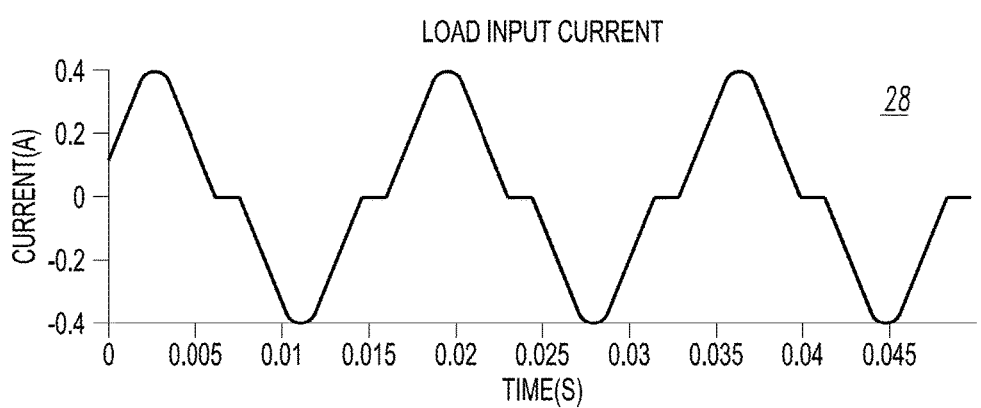
Figure 2E:
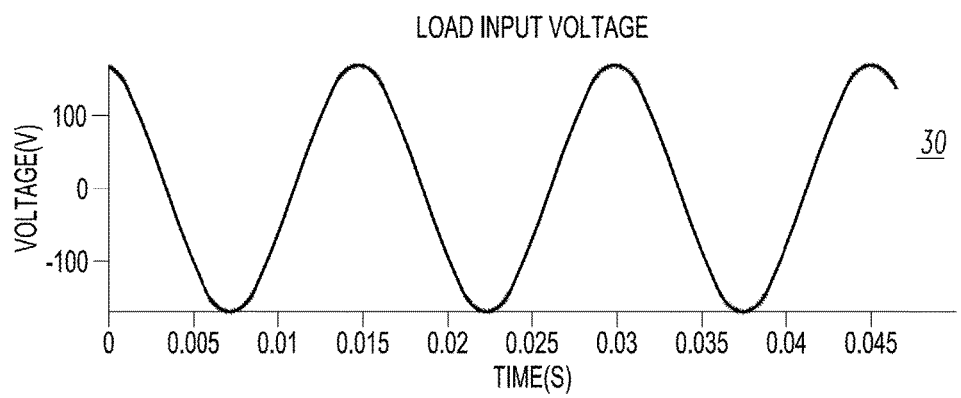
FIGS. 2E and 2F are plots of voltage and current profiles, respectively, of an oscillating fan.
Figure 2F:
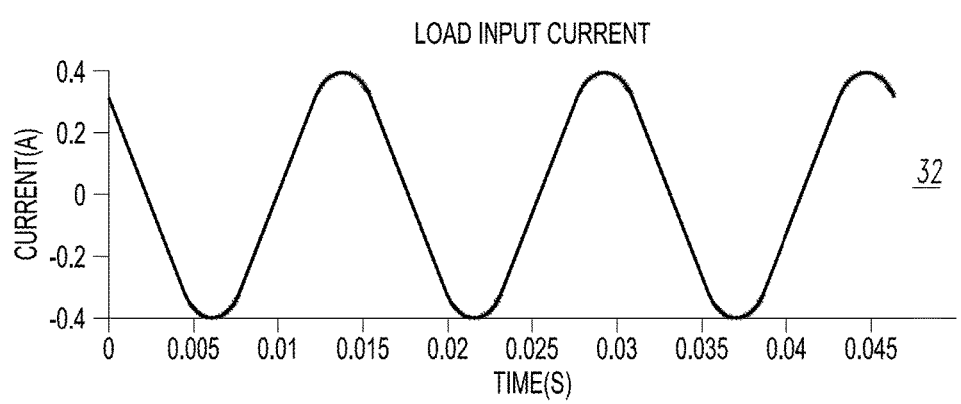

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

The disclosed concept provides a support vector machine (SVM) based advanced identification system and method for miscellaneous electric loads (MELs). Embodiments including applying only SVM as well as a combination of SVM and a supervised self-organizing map (SSOM) are disclosed. This applies the supervised SSOM to classify and identify MELs. A relatively large number of MELs are classified into several clusters. Within each cluster, a SVM can be applied to separate MELs with similar but not identical features.

In the second embodiment, SSOM first clusters a relatively large number of MELs into several classes. MELs with similar feature values fall into the same class. SVM is then employed to identify similar MELs. The combination of SVM and SSOM shows satisfactory accuracy in tests using real-world data. The hybrid SSOM/SVM identifier can achieve better performance in the sense of accuracy, robustness and applicability. The SSOM identifier first extracts information from a relatively large amount of training data and stores that simplified information in a trained neuron grid. When an input feature vector is presented to the hybrid SSOM/SVM identifier, it first determines which load category it falls into and then utilizes an SVM discriminator function for each category to make an identification decision.

Multi-Class Support Vector Machine (SVM) Classifier

A method for multi-class classification is known from basic SVMs. In the disclosed concept, a MEL identification method employs a SVM based load feature database formed from sensed current and voltage signals. Basic SVMs are inherently designed for classification of two classes, $\omega_1$ and $\omega_2$, of patterns which are described by feature vectors extracted from data in a predefined manner. If x is such a feature vector, then the SVM utilizes a (typically nonlinear) mapping from an input feature vector space to a high-dimensional (possibly infinite-dimensional) Euclidean space H, as shown by Equation 1.

$$\Phi: x \in R^l \to \Phi(x) \in H \qquad (\text{Eq. 1})$$

wherein:

x is a feature vector of dimension l;

R is the standard notation of the vector space of real numbers;

$R^l$ is the vector space of real numbers (of dimension l); and $\Phi$ is a mapping function, mapping from the l-dimension space of real numbers to the space H.

In turn, the two classes can be satisfactorily separated by a hyperplane as defined by Equation 2.

$$g(x) = \omega^T x + \omega_0 \qquad (\text{Eq. 2})$$

wherein:
ω and $\omega_o$ are co-efficients defining the hyperplane g(x);
superscript T denotes the transpose of a vector; and
g(x) is a function describing a hyperplane in high dimensional space.

Both x and ω, for example, are 2-by-1 vectors, then $\omega^T$ is of dimension 1-by-2, and g(x) is a straight line in two-dimensional space.

Once an optimal hyperplane (ω, $\omega_0$) has been determined, classification of which class an unknown feature vector x* (i.e., a different vector other than x) belongs to is performed based on the sign of g(x*). The SVM training algorithm only depends on the training data through inner products in H (i.e., on functions of the form shown in Equation 3).

$$K(x_i, x_j) = \langle \Phi(x_i), \Phi(x_j) \rangle \quad \text{(Eq. 3)}$$

wherein:
K is usually called a kernel function; it is common that an SVM needs only to specify K before its training instead of knowing the explicit form of Φ;
$x_i$, i=1, 2, ..., are feature vectors in the training data; for each $x_i$ denote the corresponding class indicator by $y_i$ (+1 for $\omega_1$ and −1 for $\omega_2$); and
the function K needs two inputs, thus there is another index besides i, that index is j.

Once an appropriate kernel has been adopted, the optimal hyperplane (ω, $\omega_0$) can be determined from Equation 4:

$$\max_\lambda \left( \sum_i \lambda_i - \frac{1}{2} \sum_{i,j} \lambda_i \lambda_j y_i y_j K(x_i, x_j) \right) \quad \text{(Eq. 4)}$$

subject to Equation 5:

$$0 \le \lambda_i \le C, \quad \text{(Eq. 5)}$$
$$\sum_i \lambda_i y_i = 0$$
$$i = 1, 2, \ldots N$$

wherein:
λ is the vector of nonnegative Lagrange multipliers $\lambda_i$;
C is a parameter to be chosen by the user with a relatively larger C corresponding to assigning a relatively higher penalty to errors; and
N is the total number of Lagrange multipliers, N=l, i.e., the dimension of feature vector x.

The resulting classifier assigns x to $\omega_1$ ($\omega_2$) if Equation 6 is met.

$$g(x) = \sum_{i=1}^{N} \lambda_i y_i K(x_i, x) + \omega_0 > (<) 0 \quad \text{(Eq. 6)}$$

FIG. 1 depicts a SVM framework 2 that employs kernel functions, K(.,.) 4, 6, 8, where each $x_i$ 10 is an input to one of the kernel functions, each $\lambda_i y_i$ 12 is a weight to the output of one of the functions, and $\omega_0$ 14 is the bias.

For multi-class SVM kernel selection, which is an M-class problem, common extensions are to either consider it as a set of M two-class problems (one-against-all) or train M(M−1)/2 basic SVM classifiers (one-against-one). In the disclosed concept, the one-against-all technique is employed. For each $\omega_i$ of the M classes, the one-against-all SVM aims at determining an optimal discriminator function, $g_i(x)$, i=1, 2, ..., M, so that $g_i(x) > g_j(x)$ for all j≠i and x∈$\omega_i$.

The classification rule is then defined by Equation 7.

$$x \in \omega_i \quad \text{(Eq. 7)}$$
$$\text{if } i = \arg\max_k \{g_k(x)\}$$

wherein:
k is an index other than i, since here i is the output number, and k denotes the index during the searching of such an output i.

Many kernels are available for SVM, such as polynomials, RBF, and hyperbolic tangent. In the disclosed concept, the Gaussian RBF kernel is employed, which is also the most commonly adopted kernel in pattern recognition problems.

Electric Load Identification Framework Using Only SVM

Known proposals apply SVM to identify harmonic sources. The features used in these proposals are high frequency harmonic components.

For the purpose of MELs identification, a different set of steady-state features with practical meaning are adopted with the voltage (V(t)) and current (I(t)) waveforms represented by Fourier series of the form shown by Equations 8 and 9, respectively.

$$V(t) = \sum_{k=1}^{\infty} V_k \sin(k\omega_0 t + \delta_k) \quad \text{(Eq. 8)}$$

$$I(t) = \sum_{k=1}^{\infty} I_k \sin(k\omega_0 t + \theta_k) \quad \text{(Eq. 9)}$$

wherein:
$\omega_0$ is frequency;
k is an index of the order of harmonics; and
$\delta_k$, $\theta_k$ are the phase angles of the k-th order harmonic.

The following six steady-state features are considered.
First, the RMS current value, $I_{RMS}$, gives equivalent information about the average power.
Second, the average displacement power factor is shown by Equation 10.

$$pf_{disp} = \cos(\delta_1 - \theta_1) \quad \text{(Eq. 10)}$$

wherein:
$pf_{disp}$ is the displacement power factor; and
$(\delta_1 - \theta_1)$ is the fundamental power factor angle.

Third, the average total harmonic distortion (THD) of current ($THD_i$) is shown by Equation 11.

$$THD_I = \frac{\sqrt{\sum_{k=2}^{\infty} I_k^2}}{I_1} \times 100\% \quad \text{(Eq. 11)}$$

wherein:
k is an index of the order of harmonics;
$I_k$ is the k-th order harmonic in current; and
$I_1$ is the fundamental, i.e., first order harmonic.

Fourth, the average power factor (pf) is determined by calculating displacement power factor and the current THD using the fast Fourier transform (FFT) of the current waveform as shown by Equation 12.

$$pf = \frac{pf_{disp}}{\sqrt{1 + THD_1^2}} \quad \text{(Eq. 12)}$$

Fifth, the crest factor (cf) or peak-to-average ratio (PAR) is determined by Equation 13.

$$cf = \frac{|I_{peak}|}{I_{RMS}} \quad \text{(Eq. 13)}$$

wherein:

$I_{peak}$ is the current's peak amplitude; and $I_{rms}$ is the current's RMS value.

The example current crest factor or PAR or peak-to-RMS power ratio (PAPR) is a measurement of a waveform, calculated from the peak amplitude of the waveform divided by the RMS value of the waveform. It is therefore a dimensionless quantity. Crest factor can be used to detect the existence of a current pulse. A sharp peak corresponds to a relatively higher value of crest factor.

Sixth, there are the normalized $3^{rd}$ (and $5^{th}$) harmonics of current.

The fact that the above example set of steady-state features is better for the purpose of MELs identification can be validated by both SVM and SSOM. For three example MELs, a DVD player (D), an LCD TV (T) and a oscillating fan (F), their voltage profiles 22,26,30 and current profiles 24,28,32 are shown in FIGS. 2A-2F.

Figure 3A:
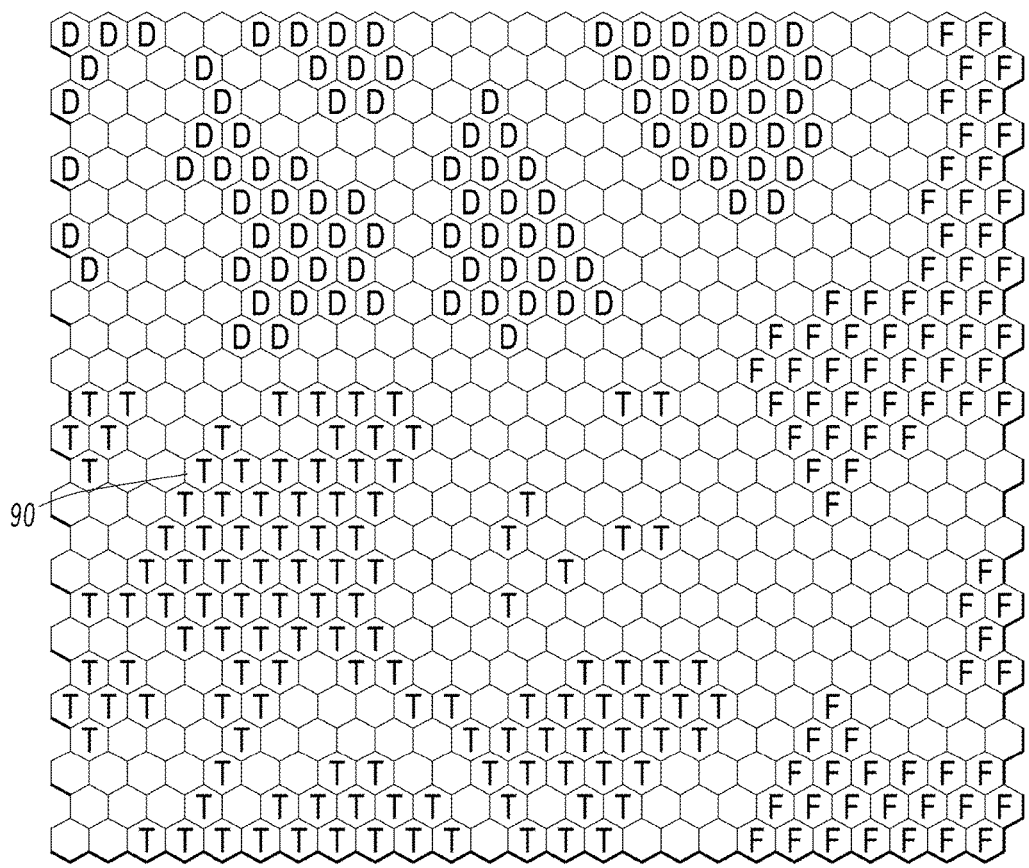
FIGS. 3A and 3B are plots of an output grid of a supervised Self-Organizing Map (SSOM) using a set of six example steady-state features and harmonics as features, respectively.
Figure 3B:
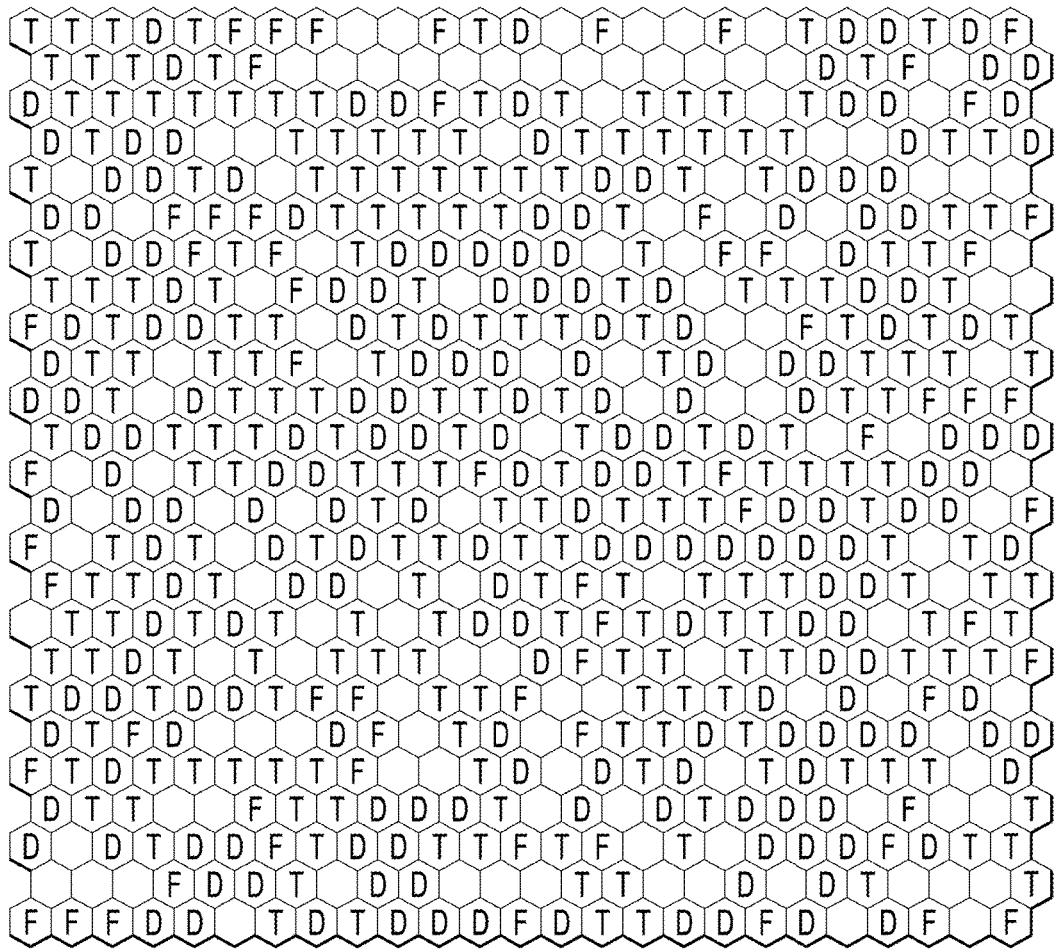

FIGS. 3A-3B show output grids 42,44 of SSOM using two sets of different features: (1) the disclosed set of six example steady-state features, and (2) harmonics as features. The SSOM output grid 42 gives a better clustered grid using the disclosed set of steady-state features. For SVM, unlike SSOM, the training output is parameters describing a high-dimensional hyper-plane, which cannot be visualized in two dimensions.

Example 1

Therefore, the advantage of the disclosed set of steady-state features over using harmonics is shown by tests as summarized in Table 1. In this example, the total number of available feature vectors for training and testing is 3600, and three different cases are tested and compared. The results are generated by solving multi-class one-against-all SVMs. This compares testing success rate of different features sets using a multi-class one-against-all SVMs.

TABLE 1

| | Success rate | | |
|---|---|---|---|
| | 270 points for training, and 3330 points for testing | 540 points for training, and 3060 points for testing | 1080 points for training, and 2520 points for testing |
| Disclosed set of six example steady-state features | 100% | 100% | 100% |
| Harmonics as features | 99.56% | 99.53% | 99.43% |

It is clear to see from Table 1 that simply using harmonics cannot guarantee a 100% success rate even with only three relatively distinct MELs.

Figure 4:
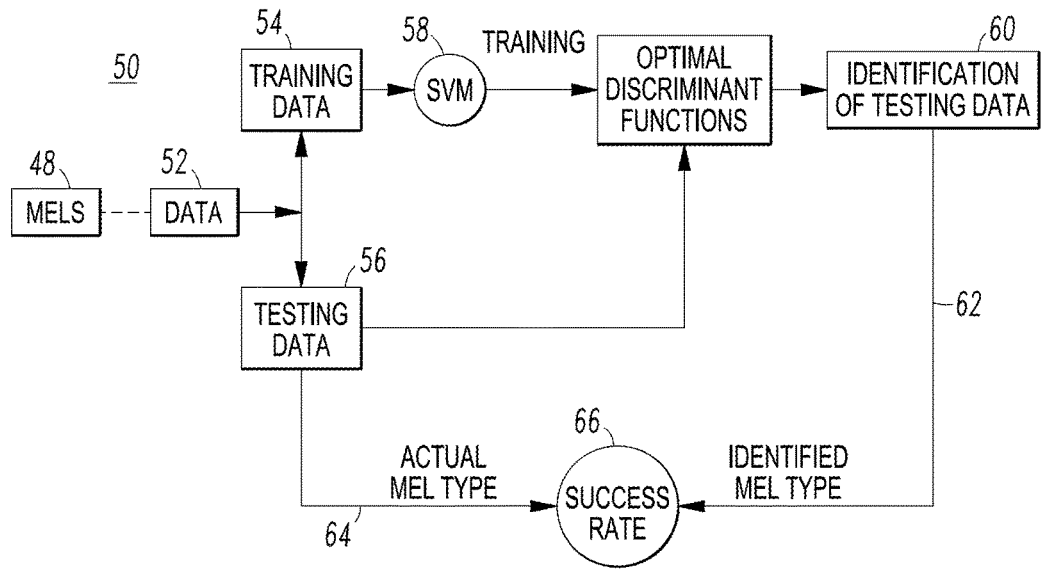
FIG. 4 is a block diagram of a cross validation mechanism for testing performance of a one-against-all SVM identifier in accordance with an embodiment of the disclosed concept.

Data was collected, processed and employed from commercially available MELs 48. Steady-state features of an example set of 42 types of MELs, with 5 to 7 brands per type, were evaluated. For the purpose of accuracy and convenience for FFT, the sampling frequency of the data acquisition (DAQ) system was set to 30.72 kS/sec. Lower sampling frequencies, such as 7.68 kS/sec and 3.84 kS/sec, were also tested with the cross validation results being relatively the same. Similar to a known SSOM classifier, a cross validation mechanism tested the performance of the one-against-all SVM identifier 50, as shown in FIG. 4. This shows the process of how to cross-validate the performance of a one-against-all SVM classifier 58. The collected data 52 is divided into two sets: training 54 and testing 56. The SVM classifier 58 is first trained by the training data and then performs identification 60 on the testing data. The results 62,64 are compared with the actual labeling of the testing data to evaluate the success rate 66 and the performance of the SVM identifier 50.

Figure 5:
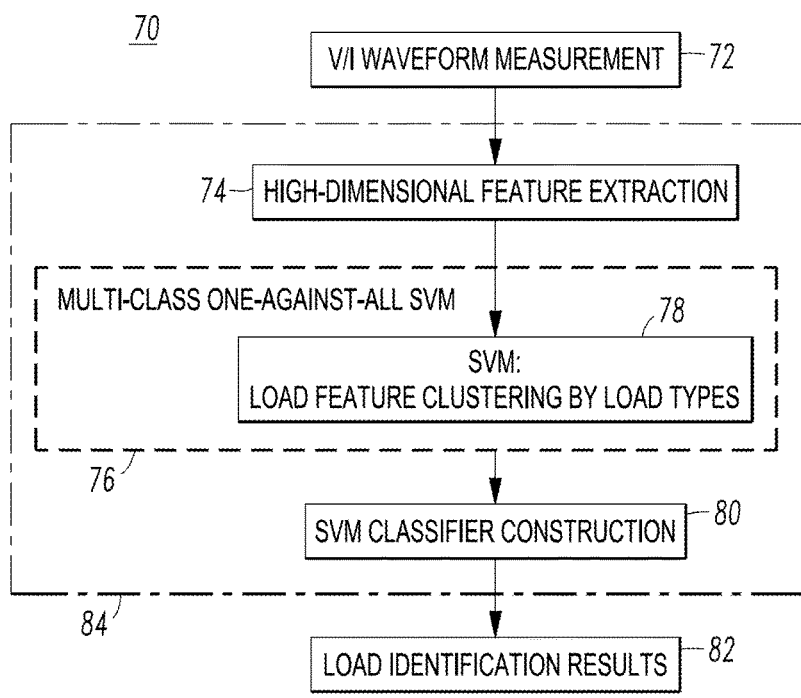
FIG. 5 is a block diagram of a support vector machine (SVM) based load classification/identification system in accordance with embodiments of the disclosed concept.

Referring to FIG. 5, a system 70 provides V/I waveform measurement 72, high-dimensional feature extraction 74, a multi-class one-against-all SVM 76 employing load feature clustering by load types 78, an SVM classifier construction 80, and load identification results 82. The system 70 also includes a processor 84 structured to determine at least six different load features from a sensed voltage signal and a sensed current signal for a corresponding one of a plurality of different electric loads, and identify, at 82, a load type of the different electric load types by relating the different load features to the SVM database 76.

Hybrid SSOM/SVM Classifier

The self-organizing map (SOM) is an unsupervised artificial neural network that is trained using competitive learning. That is, all neurons compete for the right to respond to the input data but only one neuron will win at a time. The training result of a basic SOM is a low-dimensional (typically two-dimensional), discretized grid of neurons with similar characteristics as the training samples. MELs that are similar or share common features in the input space are mapped to neurons that are positioned close to one another to form a cluster 90, as shown in FIG. 3A. With a relatively large number of MELs types, the output grid of the SSOM would get very crowded and thus unreadable, as shown in the output grid 44 of FIG. 3B.

For the purpose of MELs identification, different types of loads with similar power supply units or features are partitioned into the same cluster. For example, DVD players and set-top boxes are very similar in both front-end power supply units and steady-state operating characteristics.

Therefore, in a trained SSOM, DVD players and set-top boxes are classified into one cluster. However, the disadvantage is that it is difficult for a SSOM classifier to distinguish DVD players from set-top boxes. The SVM classifier 58 (FIG. 4), on the other hand, performs well when handling similar, but not identical, sets of feature vectors. Therefore, a hybrid SSOM/SVM achieves better performance than only the SSOM classifier or only a multi-class one-against-all SVM classifier.

Based on front-end electronic circuit topologies of MELs, electrical operation principles or the functional nature of MELs, and user usage behaviors, MELs are divided into seven example load categories with distinct steady-state features: resistive loads (R); reactive predominant loads (X); electronic loads with power factor correction circuit (P); electronic loads without power factor correction circuit (NP); linear power supply using transformer to boost voltage (T); phase angle controllable loads (PAC); and complex structures (M). For example and without limitation, different electric load types having distinct steady-state features, such as resistive appliances, motor driven appliances, electronically fed appliances, non-linear loads with direct AC connections, and other unknown load types can be employed.

Figure 6:
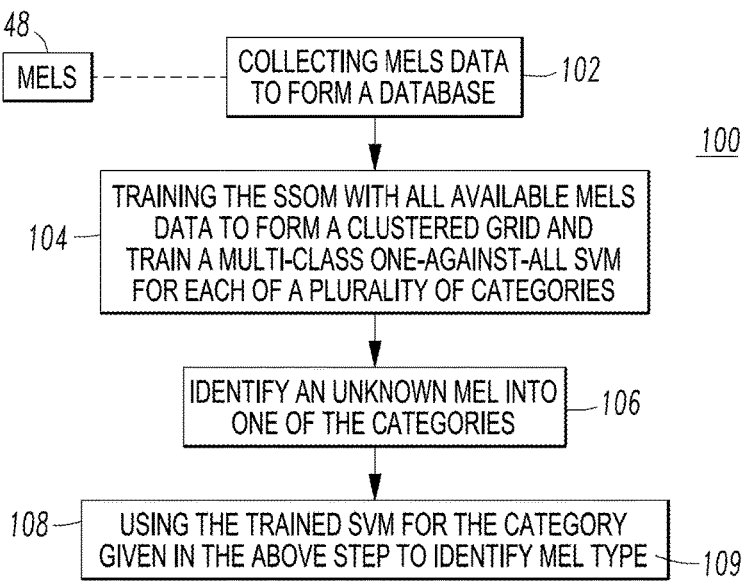
FIG. 6 is a flowchart of a hybrid SSOM/SVM classifier process in accordance with an embodiment of the disclosed concept.

The architecture of the hybrid SSOM/SVM classifier 100 is shown in FIG. 6. First, MELs data are collected to form a database at 102. Then, the SSOM is trained with all available MELs data to form a clustered grid, and a multi-class one-against-all SVM is trained for each of the seven example load categories at 104. Next, an unknown MEL is identified as being one of the seven example load categories at 106. Finally, using the trained SVM for the identified load category, the MEL type 109 is identified at 108.

Figure 7:
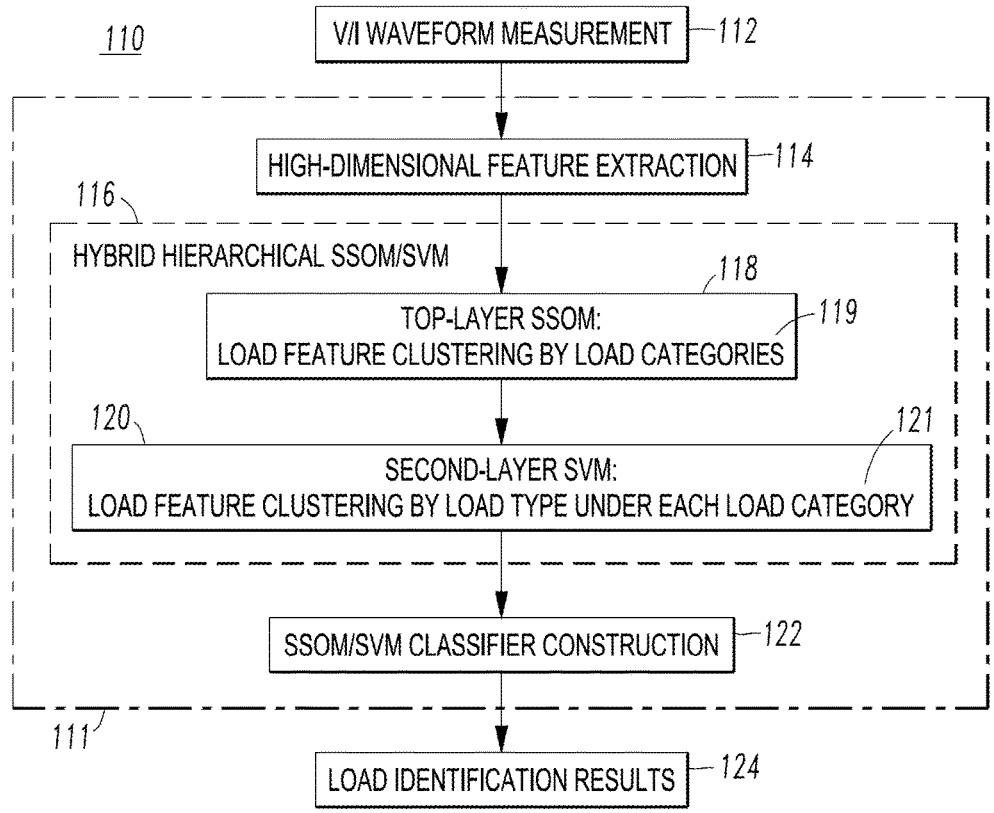
FIG. 7 is a block diagram of a self-organizing map (SSOM)/support vector machine (SVM) based load classification/identification system in accordance with embodiments of the disclosed concept.
Figure 8A:
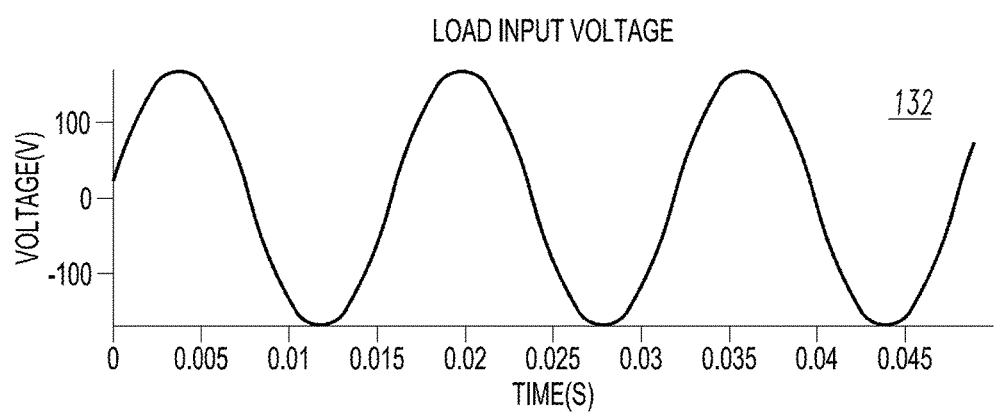
FIGS. 8A and 8B are plots of voltage and current profiles, respectively, of an LCD TV used by a trained SSOM in accordance with an embodiment of the disclosed concept.
Figure 8B:
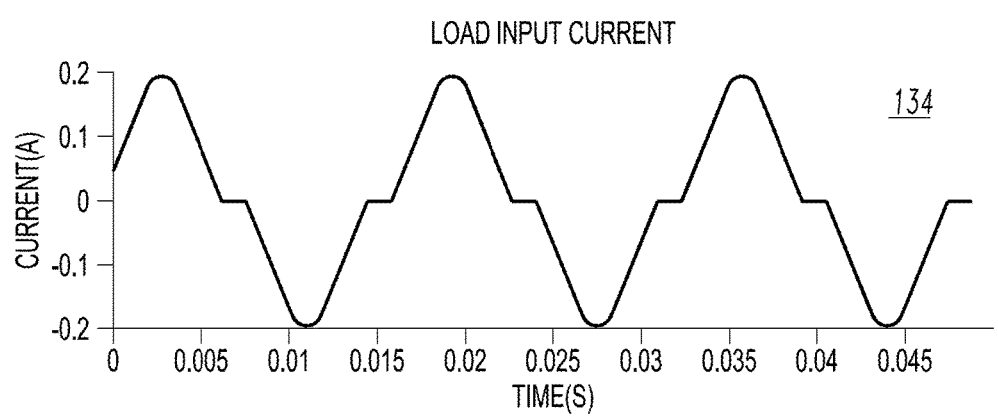
Figure 8C:
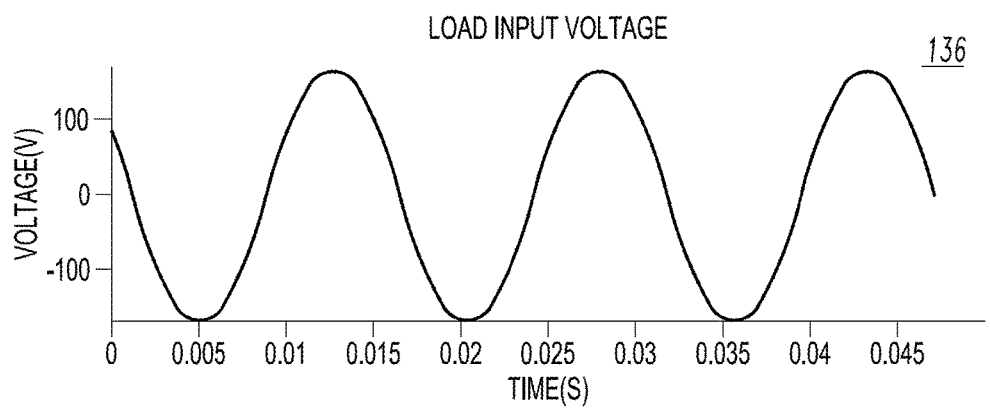
FIGS. 8C and 8D are plots of voltage and current profiles, respectively, of an LED TV used by a trained SSOM in accordance with an embodiment of the disclosed concept.
Figure 8D:
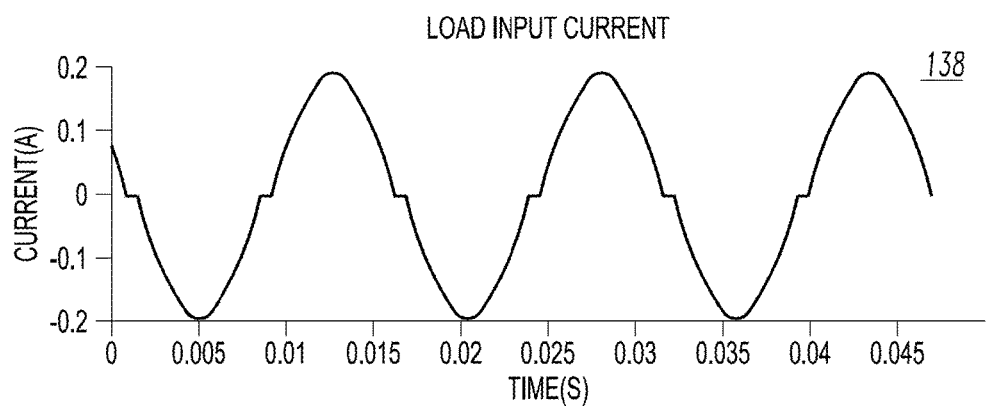
Figure 8E:
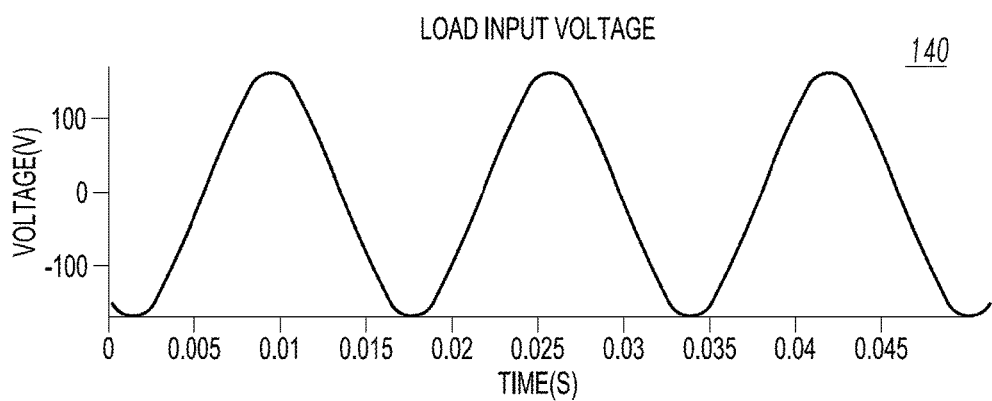
FIGS. 8E and 8F are plots of voltage and current profiles, respectively, of a plasma TV used by a trained SSOM in accordance with an embodiment of the disclosed concept.
Figure 8F:
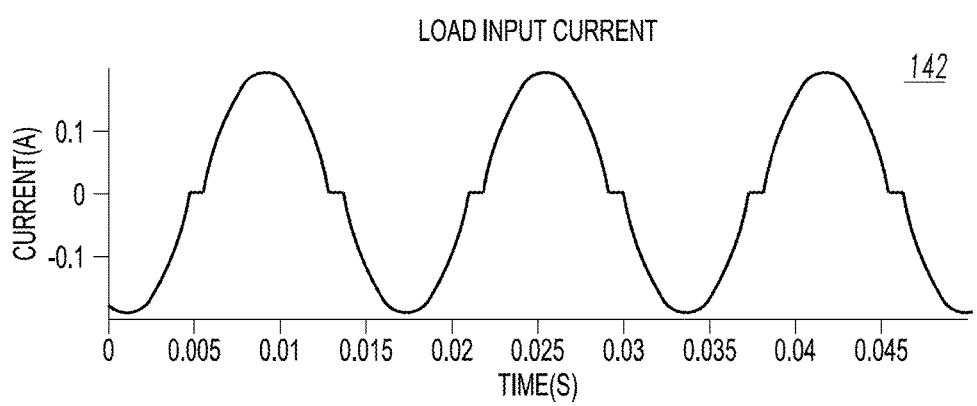

Referring to FIG. 7, a system 110 includes a processor 111, V/I waveform measurement 112, high-dimensional feature extraction 114, a hybrid hierarchical SSOM/SVM 116 including a top-layer SSOM 118 providing load feature clustering by load categories 119 and a second-layer SVM 120 providing load feature clustering by load type under each load category 121, SSOM/SVM classifier construction 122, and load identification results 124. For example and without limitation, the steady-state features of the determined load feature vector, as part of the high-dimensional feature extraction 114, can include voltage-current trajectory features selected from the group consisting of area, eccentricity, and Hausdorff distance.

Area, A, refers to the area enclosed by a V-I trajectory. Area is proportional to the magnitude of the phase shift between the voltage and the current. If current leads voltage, then Area has a positive sign. If current lags voltage, then Area becomes negative. Area is directly calculated from the coordinates of the voltage and current points, $(x_i, y_i)$, on the V-I trajectory.

Eccentricity, E, is the measure of the aspect ratio of a shape, and is the ratio of the length of the major axis to the length of the minor axis. This feature helps to identify the shape of a voltage or current waveform.

The Hausdorff distance, or Hausdorff metric, also called Pompeiu-Hausdorff distance, measures how far two subsets of a metric space are from each other. It turns the set of non-empty compact subsets of a metric space into a metric space in its own right. The Hausdorff distance is the longest distance one can be forced to travel by an adversary who chooses a point in one of the two sets, from where you then must travel to the other set. In other words, it is the farthest point of a set that you can be to the closest point of a different set.

Example 2

Table 2 summarizes several tests to show the performance of the disclosed method and system 110 for MELs identification, including the testing success rate. These test the performance of the multi-class one-against-all SVM classifier 58 of FIG. 4 on a relatively large number of MELs including a selection of typical MELs.

TABLE 2

| MELs | Identification Success Rate (%) |
|---|---|
| Compact Fluorescent Lights | 98.67 |
| Fluorescent Lights | 100.00 |
| Incandescent Lights | 100.00 |
| Fan | 100.00 |
| Printer | 99.66 |
| Cellphone Charger | 100.00 |
| DVD player | 98.66 |
| Heater | 100.00 |
| LCD TV | 99.72 |
| LED TV | 93.33 |
| Microwave | 100.00 |
| Plasma TV | 89.66 |
| Set Top Box | 100.00 |

Example 3

The multi-class one-against-all SVM classifier 58 of FIG. 4 is compared against SSOM classifier performance with different amounts of data. One advantage of the disclosed multi-class one-against-all SVM classifier 58 is that it employs a relatively small amount of training data compared with other classifiers. Some test results containing three loads and different choices of cross-validation are shown in Table 3, in which the ratios between training data and testing data are indicated in the first column. The following tests are carried out when both classifiers are trained by feature vectors from 32 different models of 12 types of MELs, with 3600 feature points for each model. For all of the tests disclosed herein, 512-point FFTs are done to calculate the features.

TABLE 3

| Success Rate | DVD | TV | Fan | Total |
|---|---|---|---|---|
| SVM (5% for training, 95% for test) | 100% | 93.77% | 100% | 97.92% |
| SVM (10% for training, 90% for test) | 100% | 93.43% | 100% | 97.81% |
| SVM (20% for training, 80% for test) | 100% | 100% | 100% | 100% |
| SVM (30% for training, 70% for test) | 100% | 100% | 100% | 100% |

TABLE 3-continued

| Success Rate | DVD | TV | Fan | Total |
|---|---|---|---|---|
| SSOM (5% for training, 95% for test) | 49.36% | 81.99% | 97.34% | 76.23% |
| SSOM (10% for training, 90% for test) | 91.30% | 87.81% | 97.69% | 92.26% |
| SSOM (20% for training, 80% for test) | 96.74% | 94.03% | 93.92% | 94.90% |
| SSOM (67% for training, 33% for test) | 99.75% | 99.83% | 98.00% | 99.19% |

From Table 3, it is clear to see that the multi-class one-against-all SVM classifier 58 can get a 100% testing success rate with only 20% of the total data, which is much better than a SSOM classifier.

Example 4

The following tests are for the hybrid SSOM/SVM classifier 100 of FIG. 6. These tests are carried out with the SSOM 118 (FIG. 7) being trained by feature vectors from 32 different models of 12 types of MELs, with 3600 feature points for each model. In this case, the output grid of the SSOM 118 gets relatively very crowded and unreadable. Therefore, it is not shown. In the trained SSOM 118, MELs with similar features are mapped into the same cluster. The voltage profiles 132,136,140 and current profiles 134,138, 142 of three types of TVs (e.g., LCD, LED and plasma) that would be clustered together are shown in FIGS. 8A-8F. These three MELs share similar front-end power supply units as well as feature vectors, and thus it is very difficult to distinguish between them.

The different types of TVs are grouped into one cluster by the SSOM classifier. However, the SSOM classifier gets an average success rate around only about 85% to identify each type of TV. In contrast, within the hybrid SSOM/SVM classifier 100, the average testing success rate is greater than 95%. These success rates, for similar MELs, are shown in Table 4.

TABLE 4

| Success Rate | LCD TV | LED TV | Plasma TV | Average |
|---|---|---|---|---|
| SSOM identifier | 80.17% | 97.85% | 85.25% | 85.28% |
| Hybrid SSOM/SVM identifier (20% data for training) | 98.30% | 78.89% | 98.96% | 92.05% |
| Hybrid SSOM/SVM identifier (30% data for training) | 95.99% | 90.95% | 98.85% | 95.26% |

From Table 4, it is clear to see that the more training data for the SVM 120 in the hybrid SSOM/SVM identifier 116, the better performance it has. But the SVM training in the hybrid SSOM/SVM identifier 116 requires far less data than a pure SSOM classifier.

Compared with methods, such as only SSOM or only SVM classifiers, the disclosed hybrid SSOM/SVM identifier 116 provides better performance in the sense of accuracy, robustness and applicability. The SSOM identifier 118 first extracts information from the relatively large amount of training data and stores that simplified information in the trained neuron grid. When an input feature vector is presented to the hybrid SSOM/SVM identifier 116, it first determines which load category it falls into, and then employs an SVM discriminator function 120 for each category to get a robust and correct identification decision.

The disclosed concept provides a hybrid SSOM/SVM classifier 116 for the purpose of intelligent and nonintrusive MELs classification and identification with relatively high identification accuracy, robustness and applicability with respect to the diversity of different models of each type of MEL. This hybrid classifier 116 employs the power of an SSOM classifier 118 for MELs to first classify the relatively large amount of MELs models into several clusters. Within each cluster, a more accurate identification decision is made by a multi-class one-against-all SVM classifier 120. This hybrid SSOM/SVM classifier 116 employs steady-state conditions. For MELs with similar power supply units, the disclosed hybrid SSOM/SVM identifier 116 provides hard (or absolute) decisions. Preferably, soft (or probabilistic) decisions should be provided for the electric load identification problem.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of identifying electric load types of a plurality of different electric loads, said method comprising:
    providing a support vector machine load feature database of a plurality of different electric load types;
    sensing a voltage signal and a current signal for each of said different electric loads;
    determining a load feature vector including at least six steady-state features with a processor from said sensed voltage signal and said sensed current signal; and
    identifying one of said different electric load types by relating the load feature vector including the at least six steady-state features to the support vector machine load feature database.

2. The method of claim 1 further comprising:
    training said support vector machine load feature database as a multi-class one-against-all support vector machine for each of a plurality of different load classes or for each of said different electric load types.

3. The method of claim 2 further comprising:
    employing as said different load classes seven different load classes having distinct steady-state features, said seven different load classes including resistive loads, reactive predominant loads, electronic loads with a power factor correction circuit, electronic loads without a power factor correction circuit, linear power supplies using a transformer to boost voltage, phase angle controllable loads, and complex structures.

4. The method of claim 2 further comprising:
employing said different electric load types having distinct steady-state features.

5. The method of claim 1 further comprising:
employing a Gaussian radial basis functions kernel with said support vector machine load feature database.

6. The method of claim 1 further comprising:
representing voltage and current waveforms corresponding to said sensed voltage signal and said sensed current signal, respectively, by Fourier series.

7. The method of claim 1 further comprising:
employing said at least six steady-state features selected from the group consisting of RMS current value, displacement power factor, total harmonic distortion of current, power factor, current crest factor, current K-factor, admittance, and normalized current third and fifth harmonics.

8. A method of identifying electric load types of a plurality of different electric loads, said method comprising:
providing a database including a first layer formed by a supervised self-organizing map database and a second layer formed by a support vector machine database;
clustering a plurality of different load classes having a plurality of different load features in the first layer;
providing a plurality of different electric load types under each of the different load classes in the second layer;
placing different ones of said different electric load types having similar load feature vectors into a same one of the different load classes;
sensing a voltage signal and a current signal for each of said different electric loads;
determining a load feature vector including a plurality of steady-state features with a processor from said sensed voltage signal and said sensed current signal; and
identifying by a support vector machine one of said different electric load types by relating the determined load feature vector including the steady-state features in the second layer of said database.

9. The method of claim 8 further comprising:
employing as said different load classes seven different load classes having distinct steady-state features, said seven different load classes including resistive loads, reactive predominant loads, electronic loads with a power factor correction circuit, electronic loads without a power factor correction circuit, linear power supplies using a transformer to boost voltage, phase angle controllable loads, and complex structures.

10. The method of claim 8 further comprising:
training the supervised self-organizing map database employing data corresponding to the different electric load types;
training the support vector machine database as a multi-class one-against-all support vector machine for each of said plurality of different load classes;
identifying said one of said different electric load types as being in one of said plurality of different load classes with said supervised self-organizing map database; and
identifying said one of said different electric load types with the trained support vector machine database for said one of said plurality of different load classes.

11. The method of claim 10 further comprising:
extracting information from the trained support vector machine database and storing simplified information in a trained neuron grid;
employing as said different load classes a plurality of different load categories;
determining one of the different load categories employing the determined load feature vector; and
employing a support vector machine discriminator function for each the different load categories to identify said one of said different electric load types.

12. The method of claim 10 further comprising:
employing as said different load classes seven different load classes having distinct steady-state features, said seven different load classes including resistive loads, reactive predominant loads, electronic loads with a power factor correction circuit, electronic loads without a power factor correction circuit, linear power supplies using a transformer to boost voltage, phase angle controllable loads, and complex structures.

13. The method of claim 8 further comprising:
representing voltage and current waveforms corresponding to said sensed voltage signal and said sensed current signal, respectively, by Fourier series.

14. The method of claim 8 further comprising:
selecting the steady-state features of said determined load feature vector from the group consisting of RMS current value, displacement power factor, total harmonic distortion of current, power factor, current crest factor, current K-factor, admittance, and normalized current third and fifth harmonics.

15. The method of claim 8 further comprising:
including with the steady-state features of said determined load feature vector voltage-current trajectory features selected from the group consisting of area, eccentricity, and Hausdorff distance.

16. A system for identifying electric load types of a plurality of different electric loads, said system comprising:
a database including a first layer formed by a supervised self-organizing map database and a second layer formed by a support vector machine database, a plurality of different load classes having a plurality of different load features being clustered in the first layer, a plurality of different electric load types being under each of the different load classes in the second layer, different ones of said different electric load types having similar load feature vectors being placed into a same one of the different load classes;
a plurality of sensors structured to sense a voltage signal and a current signal for each of said different electric loads; and
a processor structured to determine a load feature vector including a plurality of steady-state features from said sensed voltage signal and said sensed current signal, and identify by a support vector machine one of said different electric load types by relating the determined load feature vector including the steady-state features in the second layer of said database.

17. The system of claim 16 wherein said processor is further structured to train the supervised self-organizing map database employing data corresponding to the different electric load types, train the support vector machine database as a multi-class one-against-all support vector machine for each of said plurality of different load classes, identify said one of said different electric load types as being in one of said plurality of different load classes with said supervised self-organizing map database, and identify said one of said different electric load types with the trained support vector machine database for said one of said plurality of different load classes.

18. The system of claim 17 wherein said processor is further structured to extract information from the trained support vector machine database and store simplified information in a trained neuron grid, employ as said different load classes a plurality of different load categories; determine one of the different load categories employing the determined load feature vector, and employ a support vector machine discriminator function for each the different load categories to identify said one of said different electric load types.

* * * * *